J. A. OLIVER.
MOWER BUNCHER ATTACHMENT.
APPLICATION FILED OCT. 31, 1910.
1,003,061.
Patented Sept. 12, 1911.
2 SHEETS—SHEET 1.
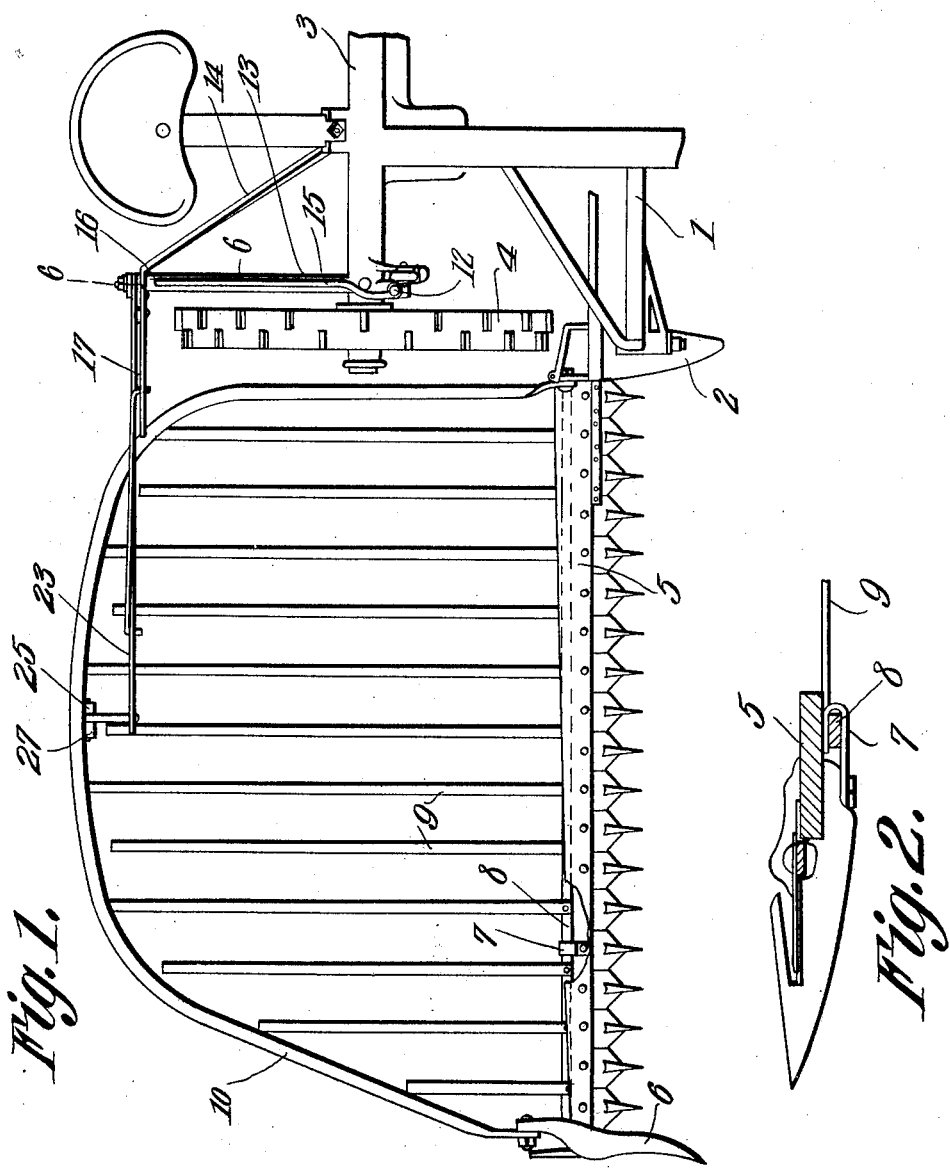
Witnesses
Joe A. Oliver
Inventor,
by C. A. Snow & Co.
Attorneys.

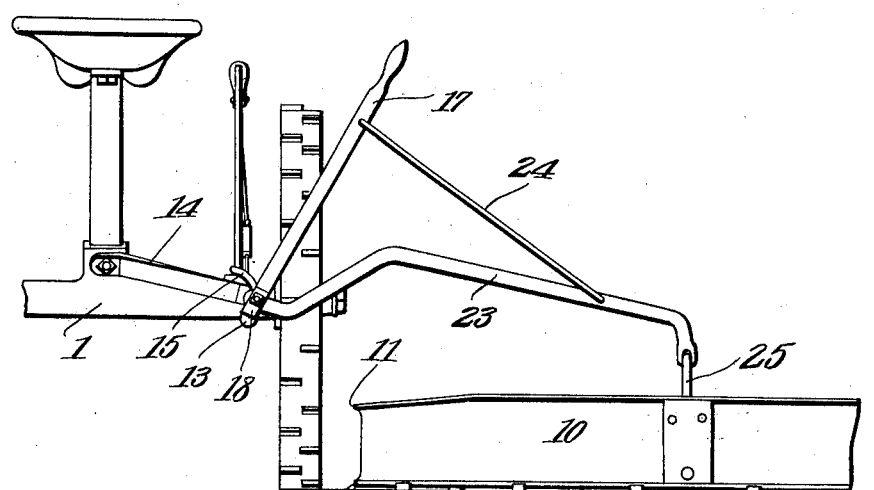
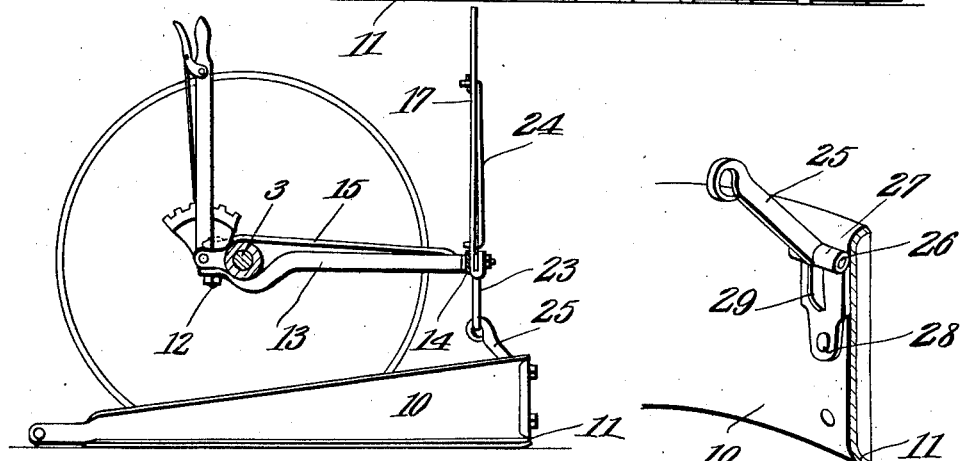
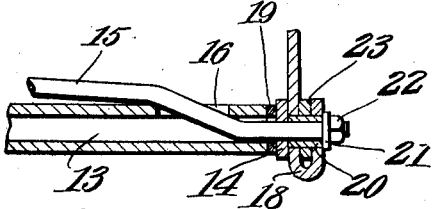

UNITED STATES PATENT OFFICE.

JOE A. OLIVER, OF SENECA, NEBRASKA.

MOWER BUNCHER ATTACHMENT.

1,003,061. Specification of Letters Patent. Patented Sept. 12, 1911.

Application filed October 31, 1910. Serial No. 590,032.

*To all whom it may concern:*

Be it known that I, JOE A. OLIVER, a citizen of the United States, residing at Seneca, in the county of Thomas and State of Nebraska, have invented a new and useful Mower Buncher Attachment, of which the following is a specification.

This invention relates to mower buncher attachments and consists in the novel construction and arrangement of its parts as hereinafter shown and described.

The object of the invention is to provide for a mower an attachment upon which the grass as it is cut is accumulated and providing means for operating the attachment whereby the said grass may be permitted to fall from the mower attachment in bunches at suitable intervals apart.

With this object in view the attachment includes a bar which is adapted to be applied to the finger bar of the mower and to which are pivotally attached the forward ends of slats. A retaining member is pivotally connected at its ends to the runner and the grass divider at the outer end of the finger bar and normally lies over the rear end portions of some of the said slats. Means are provided for raising and lowering the attachment as the finger bar is raised and lowered and also a lever mechanism is provided for swinging the said retaining member upon its pivot whereby the accumulated grass may be permitted to pass from the buncher attachment.

In the accompanying drawings:—Figure 1 is a top plan view of a portion of a mower with the attachment applied thereto. Fig. 2 is a transverse sectional view through the finger bar of the mower showing a portion of the attachment applied thereto. Fig. 3 is a rear end elevation of a portion of a mower and a portion of the attachment. Fig. 4 is a sectional view of a portion of the mower showing a portion of the attachment in side elevation. Fig. 5 is a detail perspective view of a portion of the attachment. Fig. 6 is an enlarged detail sectional view of a portion of the attachment cut on the line 6—6 of Fig. 1.

The mower to which the attachment is applied may be of any of the approved forms now generally in use and as illustrated in the accompanying drawings the frame of the mower is indicated at 1, the runner at 2, the axle at 3 and one of the supporting traction wheels at 4. The inner end of a finger bar 5 is attached to the runner 2 in the usual manner and a grass divider 6 is mounted at the outer end of the said finger bar. The finger bar carries suitable guards together with a knife bar having blades but as these parts do not coöperate with the present invention a description of the same is not given here. Hooks 7 are pivotally located under the finger bar 5 and receive a bar 8 to which is pivotally attached the forward ends of the slats 9. The bar 8 and the forward ends of the slats 9 are located under the finger bar 5 and consequently do not present any obstruction to the passage of grass from the finger bar upon the said slats. Throughout the series of slats each alternate slat is longer than the intermediate or adjacent slat and an approximately U-shaped retaining member 10 is pivotally connected at its ends to the runner 2 and the grass divider 6 and the intermediate portion of the said retaining member 10 is adapted to rest upon the ends of the longer slats of the series of slats 9 while the alternate or intermediate slats of the said series terminate short of the said retaining member 10. The rear end portions of all of the slats 9 are slightly turned in an upward direction, and the retaining member 10 at its upper and lower edges is rounded in outward and rearward directions as at 11. The object of this rounding upon the part of the said retaining member is to strengthen the structure.

A bolt 12 is mounted upon the axle 3 and at one end is connected with an angularly disposed arm 13 which extends transversely under the said axle 3 and is in the form of a hollow pipe with its rear end portion connected with a brace 14 which is in turn pivotally connected at its forward end with the intermediate portion of the said axle 3 as indicated in Fig. 3 of the drawings. A brace or truss rod 15 is connected at its forward end with the bolt 12 and at its rear end portion passes through an opening 16 provided in the upper side of the arm 13 and projects at its rear end portion beyond the rear end of the said arm 13. A lever 17 is provided at its lower end with a hook portion 18 through which the projecting end portion of the rod 15 passes. A washer 19 is located upon the projecting end portion of the rod 15 between the end of the arm 13 and the forward side of the hook portion 18 of the lever 17 and a sleeve 20 is located upon the projecting end portion of the rod 15 and fits snugly in the opening in the opposite side portions of the hook portion 18 of the said lever 17. One end of the sleeve 20 bears against the face of the washer 19 and a washer 21 located upon the projecting end portion of the rod 15 bears against the outer end of the sleeve 20. A securing nut 22 is screw threaded upon the extremity of the rod 15 and bears against the face of the washer 21. A lifting arm 23 fits snugly between the opposite side portions of the hook portion 18 of the lever 17 and is journaled upon the sleeve 20. A rod 24 is connected at one end of the upper portion of the lever 17 and at its other end with the outer portion of the lifting arm 23. A link 25 is pivotally connected at its upper end with the outer end of the lifting arm 23 and at its lower end portion the said link 25 is provided with a transversely disposed pin 26 which is hingedly mounted in a member 27. The member 27 is pivotally mounted upon a pintle 28 or its equivalent which is mounted upon the intermediate portion of the box member 10 and at the forward side thereof, whereby the said hinge member 27 may swing laterally of the said pivot 28. The link 25 is provided at its lower end with a lug 29 which is adapted at times to bear against the forward surface of the hinged member 27 and limit the downward swing of the upper end portion of the said link 25.

By this arrangement it will be seen that when the lever mechanism (not shown) which is operatively connected with the runner 2 for raising and lowering the same is swung, the lever 12 may be swung correspondingly so that the rear portion of the retaining member 10 will be supported in a proper position with relation to the finger bar 5, attached to the said runner 2. When the mower is in operation, the retaining member 10 is normally in its lowermost position and the rear end portions of the slats 9 drag upon the ground or the stubble thereon. When a sufficient quantity of grass has been accumulated against the forward side of the retaining member 10 and upon the upper surfaces of the said slats, the operator swings the lever 17 which through the connecting rod 24 will swing the lifting arm 23 upon its pivotal support and through the link 25 and hinge member 27, the rear end portion of the retaining member 10 is swung up upon the pivotal connection between the ends of the retaining member with the runner 2 and the grass divider 6. Thus the material which has been accumulated upon the upper portions of the slats 9 is swept off the said slats at the rear ends thereof by the stubble upon the surface of the ground as the mower moves in a forward direction. After the buncher attachment has been relieved of the material as indicated, the operator releases his grasp upon the lever 17, and the said lever together with its attachment falls by gravity and the retaining member 10 assumes its normal position over the rear end portions of the slats 9. By reason of the fact that the link 25 is limited in its downward swinging movement by the stops 29 the outer end portion of the lifting arm 23 is at all times held above the upper edge of the retaining member 10, and consequently will not become entangled with the grass as it accumulates upon the upper rear portions of the slats 9.

Having described the invention, what I claim as new and desire to secure by Letters Patent is:

A buncher adapted to be applied to a mower consisting of spaced slats connected with the mower, a retaining member pivotally connected with the mower and resting on the slats, a hollow arm rigidly attached at its forward end to the mower frame at a point in advance of the axle and extending rearwardly under the axle, a truss rod connected at its forward end with the frame and extending rearwardly transversely over the axle and projecting into the hollow arm through an opening provided in the rear end of said arm, and at its rear end projecting beyond the end of said arm, a lever fulcrumed upon the projecting end portion of said truss rod, means for securing the truss rod to the arm and the lever to said truss rod, and means operatively connecting the lever with said retaining member.

In testimony that I claim the foregoing as my own, I have hereto affixed my signature in the presence of two witnesses.

JOE A. OLIVER.

Witnesses:
 EMMET NUTTER,
 WM. H. LONG.

---

Copies of this patent may be obtained for five cents each, by addressing the "Commissioner of Patents, Washington, D. C."